(12) United States Patent
Funatsu et al.

(10) Patent No.: US 9,882,589 B2
(45) Date of Patent: Jan. 30, 2018

(54) ANTENNA SYSTEM

(71) Applicant: Asahi Glass Company, Limited, Chiyoda-ku (JP)

(72) Inventors: Toshifumi Funatsu, Chiyoda-ku (JP); Fumitaka Terashima, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 82 days.

(21) Appl. No.: 15/165,072

(22) Filed: May 26, 2016

(65) Prior Publication Data
US 2016/0269059 A1 Sep. 15, 2016

Related U.S. Application Data

(63) Continuation of application No. PCT/JP2014/083296, filed on Dec. 16, 2014.

(30) Foreign Application Priority Data

Dec. 20, 2013 (JP) .................. 2013-264510

(51) Int. Cl.
*H01Q 1/32* (2006.01)
*H04B 1/04* (2006.01)
*H01Q 1/12* (2006.01)
*H01Q 1/52* (2006.01)
*H04B 1/10* (2006.01)

(52) U.S. Cl.
CPC ......... *H04B 1/0475* (2013.01); *H01Q 1/1271* (2013.01); *H01Q 1/52* (2013.01); *H04B 1/1009* (2013.01)

(58) Field of Classification Search
CPC ............................... H01Q 1/1271; H01Q 1/52

USPC ......................................................... 343/713
See application file for complete search history.

(56) References Cited

U.S. PATENT DOCUMENTS

| 2009/0197558 A1 | 8/2009 | Shiotsu et al. |
| 2009/0233555 A1 | 9/2009 | Nakamura |
| 2013/0010977 A1 | 1/2013 | Hirano |

FOREIGN PATENT DOCUMENTS

| JP | 4-280125 | 10/1992 |
| JP | 2012-257155 | 12/2012 |
| JP | 2013-168744 | 8/2013 |

OTHER PUBLICATIONS

International Search Report dated Jan. 20, 2015 in PCT/JP2014/083296, filed on Dec. 16, 2014 ( with English Translation).

(Continued)

*Primary Examiner* — Graham Smith
(74) *Attorney, Agent, or Firm* — Oblon, McClelland, Maier & Neustadt, L.L.P.

(57) ABSTRACT

An antenna system includes a first antenna to receive a broadcast wave in a predetermined frequency band; a second antenna to receive noise from a noise source; and a canceler to cancel a noise signal received by the second antenna from a received signal received by the first antenna, wherein a radio wave of the broadcast wave in the predetermined frequency band equally reaches the first antenna and the second antenna, wherein reception gain for the predetermined frequency band received by the second antenna is lower than reception gain for the predetermined frequency band received by the first antenna, and wherein an output of the noise received by the first antenna is adjusted to be equal to an output of the noise received by the second antenna.

14 Claims, 14 Drawing Sheets

(56) References Cited

OTHER PUBLICATIONS

Written Opinion dated Jan. 20, 2015 in PCT/JP2014/083296, filed on Dec. 16, 2014.

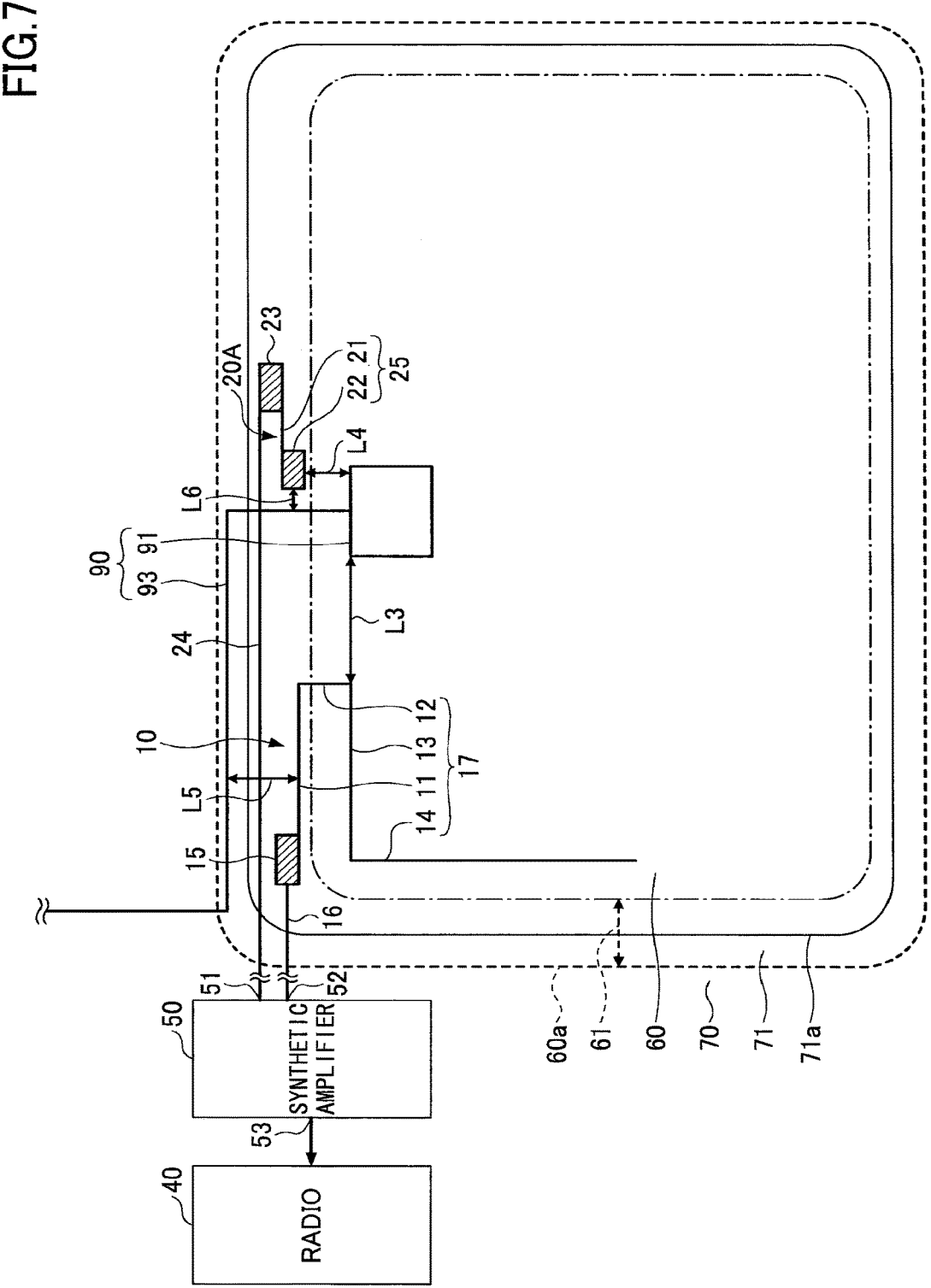

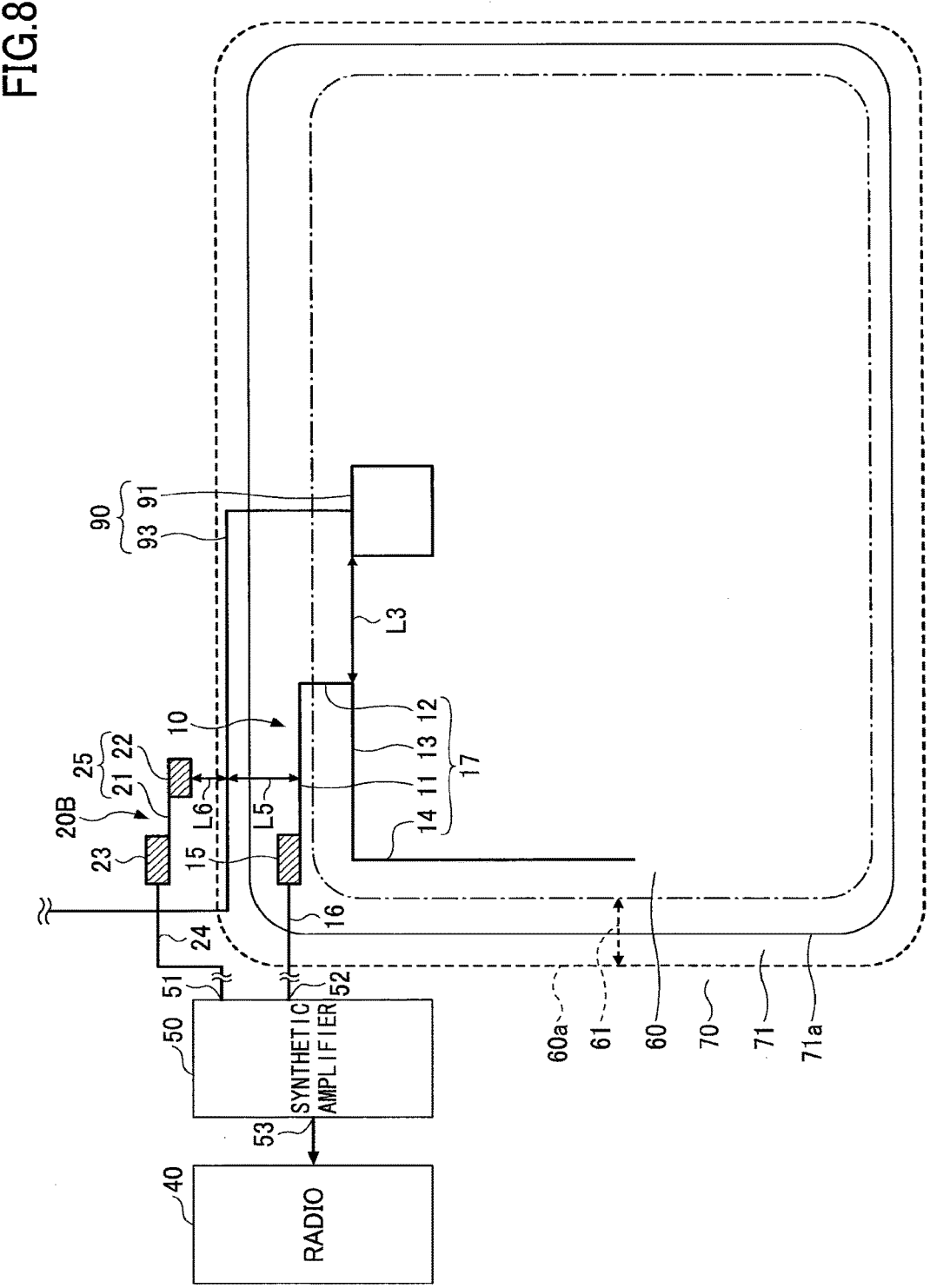

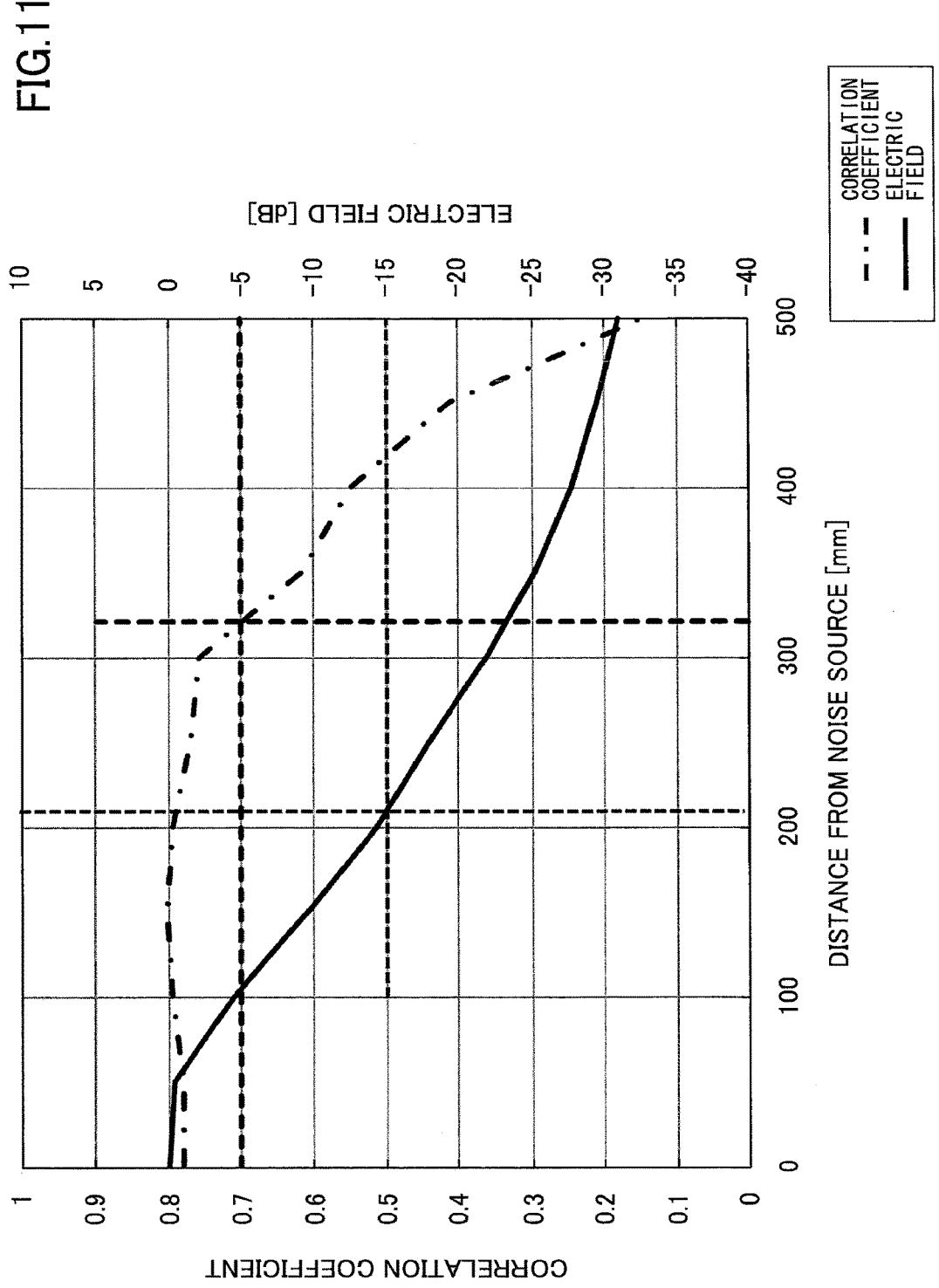

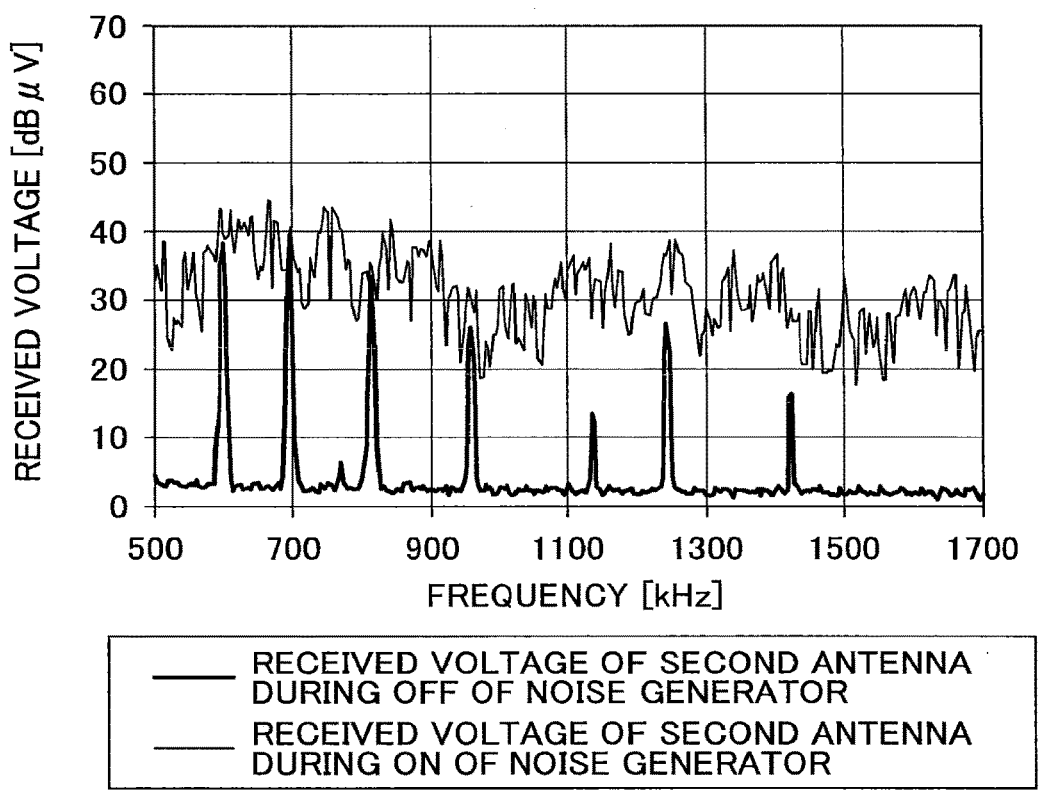

ANTENNA SYSTEM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2014/083296 filed on Dec. 16, 2014 and designating the U.S., which claims priority of Japanese Patent Application No. 2013-264510 filed on Dec. 20, 2013. The entire contents of the foregoing applications are incorporated herein by reference.

BACKGROUND OF THE INVENTION

1. Field of the Invention

The present invention relates to an antenna system to be installed in a vehicle, such as an automobile.

2. Description of the Related Art

In a so-called hybrid vehicle where an engine and a motor are used together, or in an electric vehicle, an electronic device, such as a motor and an invertor, is installed. Since noise emitted from such an electronic device affects a radio wave in a medium frequency (MF) band or in a low frequency (LF) band, there are some cases where receiving performance of an antenna for receiving a radio wave in the MF band or in the LF band is lowered.

As a technique for addressing reception disturbance caused by noise emitted from a noise source inside a vehicle, Patent Document 1 has been known, for example. Patent Document 1 discloses a technique against reception disturbance of a broadcast signal.

Patent Document 1 discloses a technique for eliminating, for a broadcast wave antenna, noise inside a vehicle, by providing, for the antenna for receiving broadcast waves (the broadcast wave antenna) installed at a position where broadcast waves can easily reach, an antenna for detecting noise (a noise detection antenna) at a bottom portion of a vehicle body, which is a location where broadcast waves tend not to reach.

Patent Document 1: Japanese Unexamined Patent Publication No. 2013-168744

According to the technique of Patent Document 1, however, it is necessary to install the noise detection antenna at a location where broadcast waves tend not to reach, so that it is not possible to install the noise detection antenna at a location where broadcast waves reach equally as the location where the broadcast antenna is installed.

There is a need for an antenna system such that a noise detection antenna is installed at a location where broadcast waves reach equally as a location where a broadcast antenna is located, so that reception performance of a broadcast wave antenna for receiving the broadcast waves can be prevented from being lowered by noise from a noise source.

SUMMARY OF THE INVENTION

According to an embodiment of the present invention, there is provided an antenna system including a first antenna that includes a first antenna conductor, and a first feeding point, wherein the first antenna is to receive a broadcast wave in a predetermined frequency band; a second antenna that includes a second antenna conductor, and a second feeding point, wherein the second antenna is to receive noise from a noise source; and a canceler to cancel a noise signal received by the second antenna from a received signal received by the first antenna, wherein the first antenna and the second antenna are installed at respective locations, a radio wave of the broadcast wave in the predetermined frequency band equally reaches, and wherein reception gain for the predetermined frequency band received by the second antenna is lower than reception gain for the predetermined frequency band received by the first antenna, and an output of the noise received by the first antenna is adjusted to be equal to an output of the noise received by the second antenna.

According to an embodiment of the present invention, a noise detection antenna is installed at a location where broadcast waves reach equally as a location where a broadcast antenna is located, so that reception performance of a broadcast wave antenna for receiving the broadcast waves can be prevented from being lowered by noise from a noise source.

BRIEF DESCRIPTION OF THE DRAWINGS

FIG. 7 is a diagram schematically illustrating an example of a configuration in the vicinity of the window glass of the vehicle in which the antenna system according to another embodiment is installed;

FIG. 8 is a diagram schematically illustrating an example of a configuration in the vicinity of the window glass of the vehicle in which the antenna system according to a modified example of the embodiment is installed;

FIG. 11 is a diagram illustrating a relationship among a distance of the second antenna 20 from a noise source 90, a correlation coefficient, and an electric field;

FIG. 12B is a graph indicating a received voltage waveform of a radio wave traveled from outside the vehicle, which is received by the second antenna.

DESCRIPTION OF THE PREFERRED EMBODIMENTS

Figure 1:
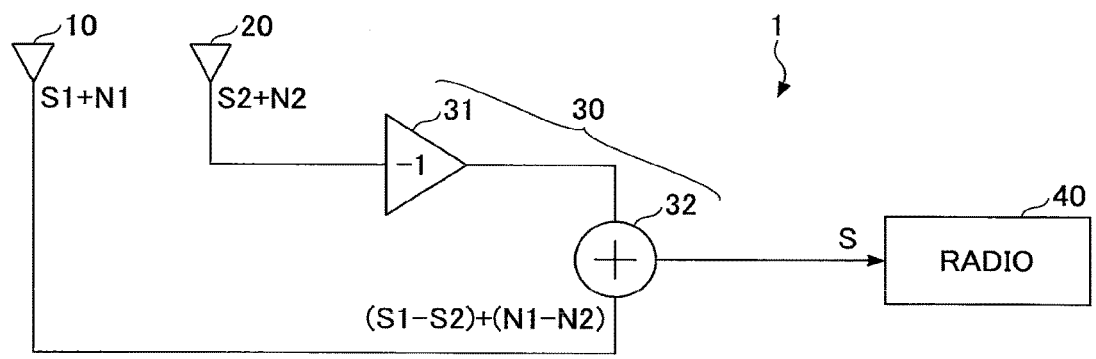
FIG. 1 is a schematic diagram illustrating a configuration of an antenna system according to an embodiment.

An embodiment for implementing the present invention is described below by referring to the drawings. Note that, in the drawings for describing the embodiment, it is assumed that, if a direction is not particularly described, the direction refers to the direction on the drawings, and a reference direction of each drawing corresponds to a direction of a symbol/number. Further, for directions, such as a parallel direction and a perpendicular direction, a deviation may be allowed to the extent that the effect of the present invention is maintained. Further, as a window glass to which the present invention can be applied, there are a front glass to be attached to a front portion of a vehicle; a rear glass to be attached to a rear portion of the vehicle; a side glass to be attached to a side portion of the vehicle; and a roof glass to be attached to a ceiling portion of the vehicle, for example.

FIG. 1 is a schematic diagram illustrating a configuration of an antenna system according to the present invention. In FIG. 1, a first antenna 10, a second antenna 20, and a canceler 30 are illustrated, which are connected to a tuner included in a radio 40. Here, a final output destination is not limited to the radio, as the embodiment, and it may be a television, for example.

Furthermore, FIG. 1 is described below by assuming a configuration such that the first antenna 10 and the second antenna 20 are installed on a window glass that is arranged at an window opening, which is formed in a vehicle body, and a noise source is installed in the vicinity of the window glass. However, it is not limited to the embodiment, and one of or both first antenna 10 and second antenna 20 may be installed at any portion of the vehicle, as long as it is a location at which a radio wave of a broadcast wave in a predetermined frequency band that is received by the first antenna 10 equally reaches the first antenna and the second antenna. For example, it can be a pole antenna or a micro pole antenna to be installed, for example, in a roof of a vehicle; or an antenna installed at a spoiler of a vehicle. Furthermore, a noise source may also be installed at any location of a vehicle, as long as it is installed at a location where noise is mixed in a received signal of the first antenna.

The first antenna 10 is a broadcast wave antenna, which is formed to be able to receive a radio wave in a predetermined band from 150 kHz to 300 MHz (the MF band, the HF band, and the VHF band). Since the first antenna 10 is arranged at the window glass, which is installed at the window opening formed in the vehicle body, the first antenna 10 receives, at a voltage that is greater than or equal to a predetermined reception voltage, both noise generated by the noise source in the vicinity of the window glass and a radio wave (a broadcast wave) for broadcasting or for radio communication, which travels from outside the vehicle. In FIG. 1, a noise signal received by the first antenna is represented by N1, and a radio signal received by the first antenna is represented by S1. Hereinafter, for describing the radio signal S1 together with the noise signal N1, it is referred to as the received signal S1+N1.

Both noise and a radio wave have respective frequencies within a band from 150 kHz to 300 MHz. As the noise source for emitting noise, for example, there are a collision mitigation system sensor having a radar, a camera, a rain sensor, a car navigation device, and an output cable thereof, which are installed in the vicinity of the window glass. A specific example of a radio wave is, for example, an AM broadcast wave included in a frequency band, which is lower than the band that is greater than or equal to 150 kHz and less than or equal to 300 MHz. In this specification, it is described below by assuming the radio wave is the AM broadcast wave.

The second antenna 20 is a noise detection antenna for receiving noise from the noise source installed in the vicinity of the window glass, on which the first antenna 10 is installed. The embodiment is described by assuming a case where the second antenna 20 is installed on the window glass on which the first antenna 10 is installed, as a location at which a radio wave of a broadcast wave in a predetermined frequency range received by the first antenna 10 equally reaches the first antenna 10 and the second antenna 20. However, the second antenna 20 may be installed in the vehicle body in the vicinity of the window glass, for example. Ideally, it is desirable that the second antenna 20 receives no radio wave at all; however, it is likely that the second antenna 20 receives both noise and a radio wave because the second antenna 20 is installed on the window glass on which the first antenna 10 is installed, and the second antenna 20 is at a location where the radio wave equally reaches as at the first antenna 10. The signals received at the second antenna 20 are represented by a noise signal N2 and a radio signal S2, respectively. Hereinafter, for describing the radio signal S2 together with the noise signal N2, it is referred to as the received signal S2+N2.

The canceler 30 cancels, from a received signal of the first antenna 10, the noise signal of the second antenna 20. In FIG. 1, as the canceler 30, a phase inverter 31 and an adder 32 are exemplified. The canceler 30 inverts one signal of the received signal S1+N1 received by the first antenna 10 and the received signal S2+N2 received by the second antenna 20, and the canceler 30 synthesizes the inverted signal and the other signal by adding them.

More specifically, in FIG. 1, a case is exemplified where a phase of the received signal S2+N2 received by the second antenna 20 is inverted by the phase inverter 31, and the inverted received signal {−(S2+N2)} output from the phase inverter 31 and the received signal S1+N1 received by the first antenna 10 are added by the adder 32.

However, in the antenna system 1, reception gain of an AM broadcast wave received by the second antenna 20 is lower compared with reception gain of the AM broadcast wave received by the first antenna 10; and an output of the noise received by the antenna 10 and an output of the noise received by the antenna 20 are adjusted, so that they are equivalent. Specifically, the radio signal S2 of the second antenna 20 is smaller compared with the radio signal S1 of the first antenna 10 (S1≫S2); the noises are adjusted, so that they are received equivalently (N1 is approximately equal to N2); the noise signal is cancelled from the received signal received by the first antenna 10, and thereby a synthetic signal S is obtained ((S1−S2)+(N1−N2)=S) (S is approximately equal to S1). Ideally, it is desirable that the second antenna 20 receives no radio wave; or it is desirable that the radio signal S2 is sufficiently smaller compared with the radio signal S1, so that substantially only the noise signal can be cancelled from the received signal received by the first antenna 10.

In this manner, the canceler 30 cancels the noise signal of the second antenna 20 from the received signal of the first antenna 10. Then, the synthetic signal S, from which the noise signal N1 is removed, can be supplied to the tuner of the radio 40, so that the receiving performance for receiving a radio wave in the AM broadcast wave band can be prevented from being lowered by the noise signal N1.

Note that, during adjustment of the signals by the canceler 30, phases and/or amplitudes of the noise signals may preferably be made uniform. The reason is that, if the phases are shifted, they do not match after the inversion. It is also preferable to perform tuning, so that the amplitudes (peak values) of the noises are made uniform.

Furthermore, in the embodiment, the example is illustrated where adjustment of the reception gain of the AM broadcast wave and the output of the noise of the first antenna 10 and the second antenna 20 are made by the difference between the signals received by the first antenna 10 and the second antenna 20. However, it is not limited by the embodiment. For example, the above-described adjustment may be implemented, by the canceller 30, by controlling at least one of the received signal of the first antenna 10 and the received signal of the second antenna 20. Additionally, it may be implemented by combining the method of adjusting by the difference between the signal received by the first antenna 10 and the signal received by the second antenna 20 and the method of adjusting by the canceler 30.

Figure 2:
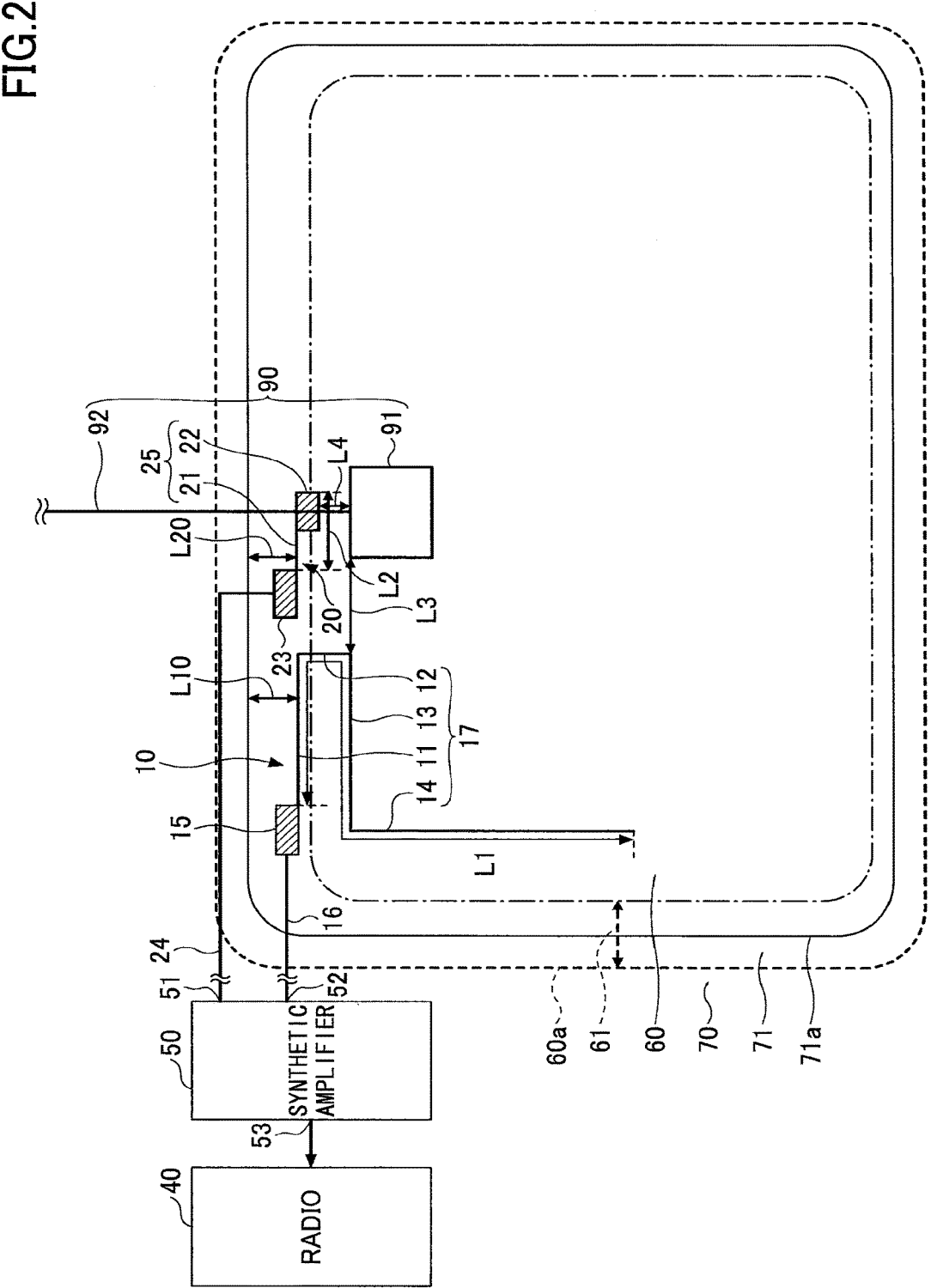
FIG. 2 is a diagram schematically illustrating an example of a configuration in a vicinity of a window glass of a vehicle in which the antenna system according to the embodiment is installed.

FIG. 2 is a diagram schematically illustrating an example of a configuration in the vicinity of the window glass of the vehicle on which the antenna system 1 according to the embodiment of the present invention is installed; and FIG. 2 exemplifies a case where the window glass 60 is a front glass. FIG. 2 is a diagram of a vehicle interior side view, which is viewed from an interior side of the vehicle. The antenna system 1 includes the first antenna 10 and the second antenna 20 that are installed on the window glass 60; and a synthetic amplifier 50, which is an example of the canceler 30, and the synthetic amplifier 50 is connected to a radio 40.

The window glass 60 is attached to a body flange 71, which is formed in a vehicle body 70. A peripheral edge 60a of the window glass 60 is depicted by a dotted line of FIG. 2. The body flange 71 is a window frame surrounding the window opening; and the body flange 71 has a flange end 71a that forms a window frame end. A chain line inside the flange 71a indicates an edge inside a shielded portion 61, which is formed on the window glass 60.

In the embodiment, it is described by assuming a case where the vehicle body 70 is formed of a metal; however, the vehicle body 70 may be formed of another material. For example, the material may be an insulating material, such as a resin; or a carbon.

In FIG. 2, the noise source 90 includes a noise generator 91; and an output cable 92 connected to the noise generator 91. The noise generator 91 is attached to a surface of the window glass 60 through a bracket; the noise generator 91 is connected to one end of the output cable 92; and the other end of the output cable 92 is connected to an electronic circuit, which is not depicted. The location where the noise generator 91 is installed is not limited to that of the embodiment; and the noise generator 91 may be installed in the vicinity of the window glass 60. The vicinity of the window glass 60 may be at a periphery of the vehicle body opening; or the vicinity of the window glass 60 may be at a ceiling portion of the vehicle body.

From the noise source 90, noise in a frequency band in the band from 150 kHz to 300 MHz is radially emitted. Thus, under the same condition, the noise is attenuated, as it is separated from the noise source 90. Due to this property, if the same antennas are used, the antenna that is closer to the noise source 90 receives the noise more strongly.

Furthermore, a waveform of the generated noise and strength of the emitted noise from the noise generator 91 differ from a waveform of the generated noise and strength of the emitted noise from the output cable 92. Namely, in FIG. 2, the noise generator 91 and the output cable 92 are individual noise sources.

Here, the output cable 92 is not always a noise source. For a case of a configuration where an output cable is shielded, such as a case where a coaxial cable is used as the output cable, noise is hardly emitted outside, so that the output cable is not a noise source. In the description of the embodiment below, a case is described where only the noise generator 91 is the noise source.

The first antenna 10 includes a first feeding point 15 that is arranged at an upper corner portion of the window glass 60; and a first antenna conductor 17 that extends from the first feeding point 15. The first antenna 10 outputs, from the first feeding point 15, a radio signal in the AM broadcast wave band with a reception voltage that is greater than or equal to a predetermined reception voltage in a state in which noise from the noise source 90 inside the vehicle in a frequency band that is the same as that of the AM broadcast wave is mixed in the radio wave in the AM broadcast wave band traveling from outside the vehicle. Here, the first antenna 10 may be arranged at any position in the window glass 60.

The first antenna conductor 17 is a line-shaped conductor that extends on a surface of the window glass 60 or that extends in the window glass 60; and the first antenna conductor 17 includes antenna elements 11, 12, 13, and 14. In FIG. 2, the antenna element 11 that is connected to the first feeding point 15 extends horizontally in the shielding film 61 at an upper portion of the window glass 60; and the antenna element 12 is connected to the antenna element 11, and the antenna element 12 extends vertically. The antenna element 13 is connected to the antenna element 12, and the antenna element 13 extends horizontally along the shielding film 61 at a position without the shielding film 61; and the antenna element 14 is connected to the antenna element 13, and the antenna element 14 extends vertically. Performance of receiving the AM broadcast wave with an antenna tends to be enhanced, as the conductor length becomes greater, and as the conductor is extended in a direction to separate from the feeding point, regardless of the shape of the antenna. Thus, the shape of the first antenna conductor 17 is not particularly limited to that of the embodiment, and it suffices if it has a conductor length with which the AM broadcast wave can be received, and if it is extended in a direction to separate from the feeding point.

The second antenna element 20 includes a second feeding point 23 arranged at an upper side of the window glass 60; and a second antenna conductor 25 that extends from the second feeding point 23. Since the second antenna 20 is installed on the window glass on which the first antenna 10 is installed, the second antenna conductor 25 receives both radio waves in the AM broadcast wave band traveling from outside the vehicle and noise from the noise source 91 and from the output cable 92 in a frequency band that is the same as the AM broadcast wave band; and the second antenna conductor 25 outputs the received signal from the second feeding point 23.

A conductor length L2 of the second antenna conductor 25 is less than a conductor length L1 of the first antenna conductor 17. For receiving the radio wave and the noise in the AM broadcast wave band, performance for receiving the respective signals tends to be enhanced, as the conductor length of the antenna conductor becomes greater. Thus, with such a configuration, it is possible to cause the radio wave in the AM broadcast wave band and the noise from the noise source 90 not to be easily received, compared to the first antenna 10. As described above, in order to obtain sufficient reception gain for the AM broadcast wave upon subsequent cancellation, a difference between a reception voltage of the first antenna 10 for the AM broadcast wave band and a reception voltage of the second antenna 20 for the AM broadcast wave band may preferably be greater than or equal to 5 dB. In order for the difference between the reception voltages to be greater than or equal to 5 dB, the conductor length of the second antenna conductor 25 may preferably be less than or equal to 50% of the conductor length of the first antenna conductor 17. Details of the conductor length of the first antenna conductor 17 and the conductor length of the second antenna conductor 25 are described below.

Further, for a case where the vehicle body 70 is formed of a metal, in the window in the same opening, as a position at which the antenna is installed becomes closer to the vehicle body 70 (the body flange 71), a part of the radio wave of the broadcast wave and the noise received by the antenna leaks to the vehicle body 70 (the body flange 71), so that outputs of the signals obtained from them tend to be lowered. Thus, by installing the second antenna 20 closer to the vehicle body 70 (the body flange 71), compared to the first antenna 10, outputs of the signals obtained from the AM broadcast wave and from the noise source, respectively, can be lowered. Specifically, it is desirable to make a shortest distance L20 between the second antenna 20 and the flange end 71a of FIG. 2 to be less than a shortest distance L10 between the first antenna 10 and the flange end 71a.

Furthermore, the second antenna 20 is installed at a position closer to the noise generator 91, compared to the first antenna 10. Specifically, a most proximate distance L4 between the second antenna conductor 25 and the noise generator 91 is less than a most proximate distance L3 between the first antenna conductor 17 and the noise generator 91 (L4<L3). It is desirable to make L4 less than or equal to 80% of L3; more preferably less than or equal to 50%; and further more preferably less than or equal to 20%. In this manner, by installing the second antenna 20 at a position closer to the noise generator 91, compared to the first antenna 10, the second antenna 20 can be caused to easily receive noise from the noise generator 91.

For example, it is desirable that the second antenna 20 is installed at a position that is less than or equal to 210 mm from the noise generator 91, preferably less than or equal to 180 mm, more preferably less than or equal to 150 mm, and further more preferably less than or equal to 100 mm; and the second antenna 20 is arranged, so that the above-described relationship of L3 and L4 is satisfied.

Additionally, the second antenna conductor 25 includes a line-shaped conductor 21 that extends on the surface of the window glass 60 or in the window glass 60; and a widened portion 22 with a line width that is greater than a line width of the line-shaped conductor 21. By providing such a widened portion 22, it can be made easier to receive noise from the noise generator 91, almost without changing the sensitivity for receiving the AM broadcast wave, which depends on the conductor length. Furthermore, by adjusting the size of the widened portion 22, the strength of the noise to be received can be adjusted.

As described above, by shortening the conductor length of the second antenna conductor 25, it can be made difficult to receive the AM broadcast wave and the noise; by reducing the distance between the second antenna 20 and the body flange 71, the outputs of the signals obtained from the AM broadcast wave and the noise source are lowered; and by reducing the distance between the second antenna 20 and the noise source 90, and by providing the second antenna 20 with the widened portion 22, it can be made easier to receive the noise. By using these techniques, the reception gain of the AM broadcast wave received by the second antenna 20 can be made sufficiently smaller compared with the reception gain of the AM broadcast wave received by the first antenna 10; and an output of the noise received by the first antenna 10 and an output of the noise received by the second antenna 20 can be adjusted to be equal.

Here, it is not necessary to adjust by using all the above-described techniques; and it suffices if, by using only necessary techniques, sufficient reception gain of the AM broadcast wave can be obtained during subsequent cancellation. For example, by only using the technique of reducing the distance between the second antenna 20 and the noise source 90, and subsequently adjusting the reception voltages by a canceler, such as the synthetic amplifier described below, an adjustment can be made so that a voltage of a signal of the AM broadcast wave of the second antenna 20 is less than a voltage of the signal of the AM broadcast wave of the first antenna 10, and that a voltage of the noise signal of the first antenna 10 is equal to a voltage of the noise signal of the second antenna 20.

Note that, if noise is also generated in the output cable 92 in FIG. 2, the second antenna 20 may preferably be located so that the second antenna 20 overlaps the output cable 92 in a planar view, as illustrated in FIG. 2. In this manner, the second antenna may be installed to overlap the output cable 92 in the planar view; and the distance between the second antenna 20 and the output cable 92 may be adjusted so that the distance between the second antenna 20 and the output cable 92 is less than the distance between the first antenna 10 and the output cable 92. Furthermore, in FIG. 2, the widened portion 22 of the second antenna 20 is provided, so that the widened portion 22 overlaps the output cable 92 in the planar view. With such a configuration, it can be made easier to receive the noise generated by the output cable 92.

The first feeding point 15 and the second feeding point 23 are feeding points for connecting the first antenna conductor 17 and the second antenna conductor 25 to terminals 51 and 52 of the synthetic amplifier 50 through conductive members 16 and 24, respectively. When the window glass 60 is attached to the body flange 71, the first feeding point 15 and the second feeding point 23 may be installed in the vicinity of the body flange 71. Furthermore, in the embodiment, a case is illustrated where the first feeding point 15 and the second feeding point 23 are monopolar; however each of the first feeding point 15 and the second feeding point 23 may be bipolar, which includes two feeding points. As a conductive member, a feeder is used, such as an AV line and a coaxial cable. When AV lines are used, one end is connected to the first feeding point 15 and the other end is connected to the terminal 52 of the synthetic amplifier 50; and one end is connected to the second feeding point 23 and the other end is connected to the terminal 51 of the synthetic amplifier 50. When coaxial cables are used, inner conductors of the coaxial cables are electrically connected to the feeding points 15 and 23, respectively; and outer conductors of the coaxial cables may be grounded to the vehicle body 70.

Additionally, a connector for electrically connecting to the first feeding point 15 may be installed in the first feeding point 15; and a connector for electrically connecting to the second feeding point 23 may be installed in the second feeding point 23. With such connectors, it can be made easier to attach the AV lines or the inner conductors of the coaxial cables to the first feeding point 15 and to the second feeding point 23, respectively. Furthermore, a configuration may be adopted where a signal processing circuit, such as an amplifier, is implemented in the connector. Further, a configuration may be such that conductive members having protruding shapes are installed in the first feeding point 15 and the second feeding point 23, respectively, and the conductive members having the protruding shapes contact and engage respective connecting portions formed in the body flange 71, to which the window glass 60 is to be attached.

The shapes of the first feeding point 15 and the second feeding point 23 may be determined depending on shapes of surfaces for implementing the above-described conductive members or the connectors. For example, for implementation, a rectangular shape or a polygonal shape is preferable, such as a square, an approximate square, a rectangle, and an approximate rectangle. Here, it can be a circular shape, such as a circle, an approximate circle, an oval, or an approximate oval.

Here, the first antenna conductor 17, the second antenna conductor 25, the first feeding point 15, and the second feeding point 23 are formed by printing a pattern on the surface of the window glass 60 facing inside the vehicle by using paste including a conductive metal, such as silver paste, and baking the printed pattern. However, the forming method is not limited to this forming method. A linear body or a foil-shaped body formed of a conductive material, such as copper, may be formed on the surface of the window glass 60 facing inside the vehicle or facing outside the vehicle. The linear body or the foil-shaped body may be attached to the window glass 60 by using an adhesive, or the linear body or the foil-shaped body may be formed inside the window glass 60. Further, a glass antenna may be obtained by forming a synthetic resin film having a conductive layer on the surface of the window glass 60 facing inside the vehicle or on the surface of the window glass 60 facing outside the vehicle. Additionally, a glass antenna may be obtained by forming, on the surface of the window glass 60 facing inside the vehicle or on a surface of the window glass 60 facing outside the vehicle, a flexible circuit board in which the antenna conductor is formed.

Further, a shielding film 61 may be formed on the surface of the window glass 60, and a portion of or all the feeding point and the antenna conductor may be formed on the shielding film 61. As the shielding film 61, there is ceramics, such as a black ceramics film. In this case, when the window glass 60 is viewed from outside the vehicle, at least a part of the first antenna conductor 17, the second antenna conductor 25, the first feeding point 15, and the second feeding point 23, which is formed on the shielding film 61, is invisible from outside the vehicle due to the shielding film 61. Thus, the window glass 60 is superior in design. By forming a part of the feeding point and the antenna conductor on the shielding film 61 (between the edge of the shielding film 61 and the edge of the window glass 60), only a thin straight-line portion of the conductor is viewed in a vehicle exterior side view (and in a vehicle interior side view), so that it is preferable for the design.

The synthetic amplifier 50 is an example of the canceler 30 for cancelling the noise signal of the second antenna 20 from the received signal of the first antenna 10. The synthetic amplifier 50 outputs, to the radio 40 through a terminal 53, the received signal which is obtained by removing the noise signal of the second antenna 20 from the received signal of the first antenna 10.

Figure 3:
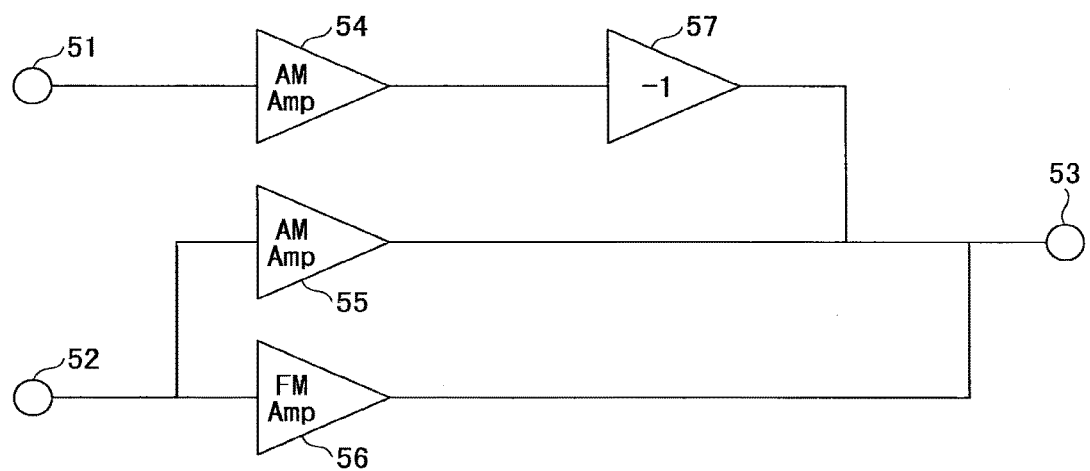
FIG. 3 is a diagram illustrating an example of a first configuration of a synthetic amplifier of FIG. 2.

FIG. 3 is a diagram illustrating an example of a first configuration of the synthetic amplifier 50. The synthetic amplifier 50 of the figure is a canceler including an AM amplifier (AM Amp) 55; an AM amplifier 54; and a phase inverter 57. The synthetic amplifier 50 cancels the noise signal of the second antenna 20 from the received signal of the first antenna 10 by the phase inverter 57.

The AM amplifier 55 amplifies the received signal of the first antenna 10 input form the terminal 52, and the AM amplifier 55 outputs the amplified received signal. The AM amplifier 54 amplifies the noise signal of the second antenna 20 input from the terminal 51, and the AM amplifier 54 outputs the amplified noise signal. The phase inverter 57 outputs a signal obtained by inverting a phase of the output signal of the AM amplifier 54 by 180 degrees. The synthetic amplifier 50 outputs, to the radio 40 through the terminal 53, a signal obtained by synthesizing the output signal from the AM amplifier 55 and the output signal from the phase inverter 57 as a synthesized signal.

Note that the synthetic amplifier 50 may include an FM amplifier (FM Amp) 56. The FM amplifier 56 amplifies the received signal received by the first antenna 10, which is input from the terminal 52; and the FM amplifier 56 outputs, to the radio 40 through the terminal 53, the amplified signal as a synthesized signal.

Figure 4:
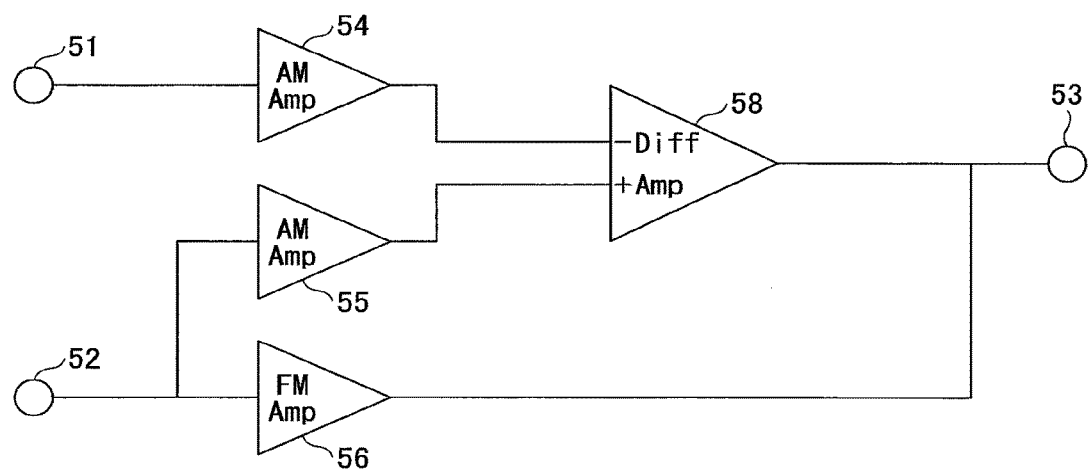
FIG. 4 is a diagram illustrating an example of a second configuration of the synthetic amplifier of FIG. 2.

FIG. 4 is a diagram illustrating an example of a second configuration of the synthetic amplifier 50. Descriptions of configurations that are same as the above-described configuration are omitted. The synthetic amplifier 50 of the figure is a canceler including the AM amplifier 55; the AM amplifier 54; and a differential amplifier (Diff Amp) 58. The synthetic amplifier 50 cancels the noise signal of the second antenna 20 from the received signal of the first antenna 10 by the differential amplifier 58.

The differential amplifier 58 amplifies a voltage difference between the output signal from the AM amplifier 55 and the output signal from the AM amplifier 54; and the differential amplifier 58 outputs the amplified signal to the radio 40 through the terminal 53. The differential amplifier 58 outputs, by its differential amplifying function, a signal obtained by removing the component of the noise signal of the first antenna 10, as a synthesized signal.

Figure 5:
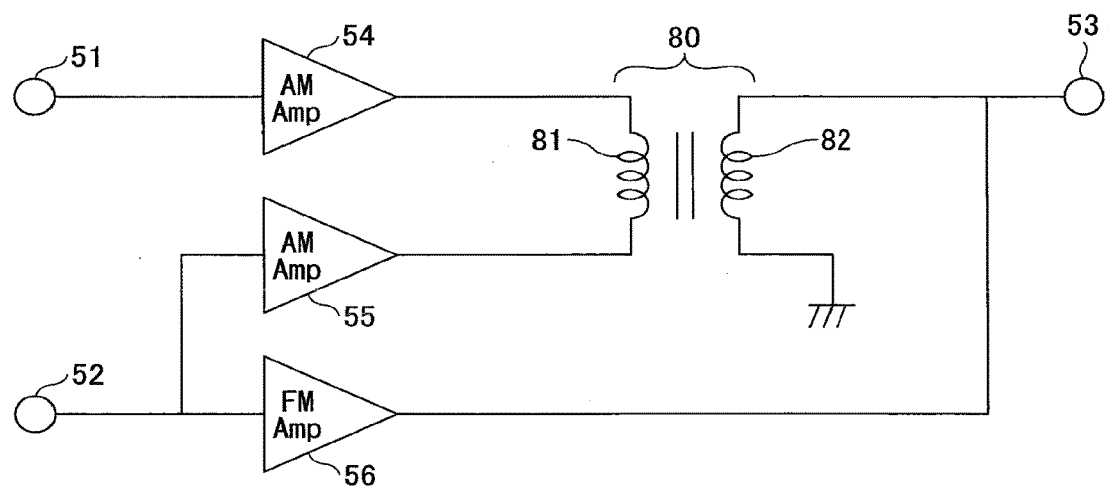
FIG. 5 is a diagram illustrating an example of a third configuration of the synthetic amplifier of FIG. 2.

FIG. 5 is a diagram illustrating an example of a third configuration of the synthetic amplifier 50. Descriptions of configurations that are same as the above-described configuration are omitted. The synthetic amplifier 50 of the figure is a canceler including the AM amplifier 55; the AM amplifier 54; and a transformer 80. The synthetic amplifier 50 cancels the noise signal of the second antenna 20 from the received signal of the first antenna 10 by the transformer 80.

The transformer 80 is a potential transformer including a primary coil 81; and a secondary coil 82. The primary coil 81 includes one end portion that is connected to the first feeding point 15 of the first antenna 10 through the terminal 52 and the AM amplifier 55; and the other end portion that is connected to the second feeding point 23 of the second antenna 20 through the terminal 51 and the AM amplifier 54. The secondary coil 82 includes one end portion that is connected to the radio 40 through the terminal 53; and the other end portion that is connected to the ground. In the transformer 80, the received signal of the first antenna 10 is input to the one end of the primary coil 81, and the noise signal of the second antenna 20 is input to the other end of the primary coil 81. With this configuration, a signal obtained by removing the noise signal of the second antenna 20 can be output from the secondary coil 82, as a synthesized signal.

Figure 6:
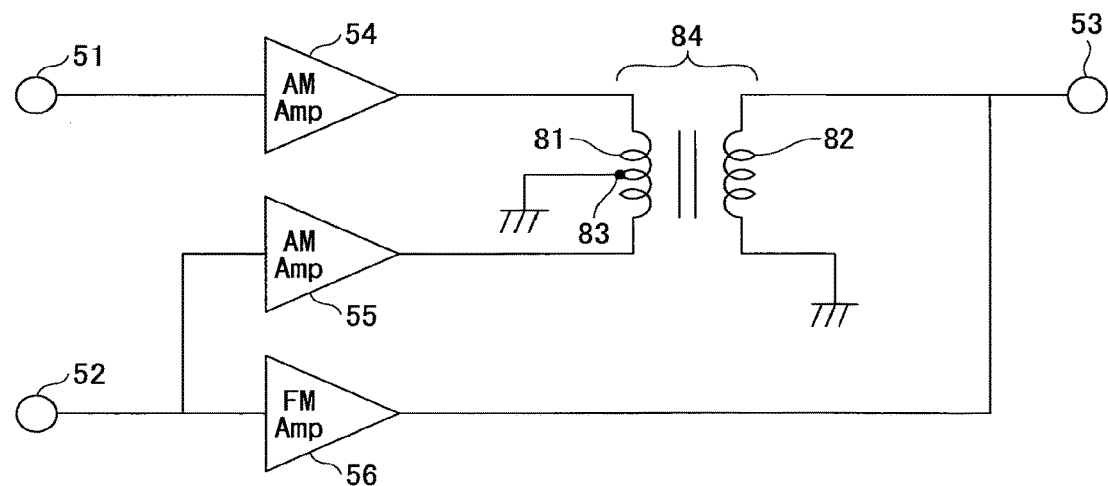
FIG. 6 is a diagram illustrating an example of a fourth configuration of the synthetic amplifier of FIG. 2.

FIG. 6 is a diagram illustrating an example of a fourth configuration of the synthetic amplifier 50. Descriptions of configurations that are same as the above-described configuration are omitted. The synthetic amplifier 50 of the figure is a canceler including the AM amplifier 55; the AM amplifier 54; and a transformer 84. The synthetic amplifier 50 cancels the noise signal of the second antenna 20 from the received signal of the first antenna 10 by the transformer 84.

Similar to FIG. 5, the transformer 84 of FIG. 6 can output, from the secondary coil 82, a signal obtained by removing the component of the noise signal of the second antenna 20, as a synthesized signal. Additionally, the transformer 84 of FIG. 6 includes a center tap 83 that is connected to a middle portion of the primary coil 81, and the center tap 83 is connected to the ground. Thus, the transformer 84 of the figure can be used for balance-unbalance conversion, and the transformer 84 can be easily connected to the radio 40 from the to/urinal 53 with an unbalanced line, such as a coaxial cable.

Further, in the configuration according to the embodiment, by devising the shape and arrangement of the antenna, performance of the second antenna 20 for receiving the noise can be made substantially equal to performance of the first antenna 10 for receiving the noise, without the adjustment by the synthetic amplifier 50. Namely, the output of the noise from the second antenna 20 is adjusted, so that the output of the noise from the second antenna 20 is the same output level as the output of the noise from the first antenna 10. In this manner, the voltage of the noise signal (noise voltage) mixed in the received signal that is output from the first feeding point 15 of the first antenna 10 and the noise voltage of the received signal that is output from the second feeding point 23 of the second antenna 20 can be made close to substantially equal values.

Consequently, an amount of the adjustment, by the synthetic amplifier 50, of the noise voltage for combining the received signal of the first antenna 10 and the received signal of the second antenna 20 can be minimized or eliminated, so that the configuration of the canceler 30, such as the synthetic amplifier 50, can be simplified.

Alternatively, even if there is a difference between the noise voltage of the first antenna 10 and the noise voltage of the second antenna 20, by adjusting the received voltages of the synthetic amplifier 50 to adjust the respective noise voltages, a favorable noise cancellation state can be achieved.

FIG. 7 is a schematic diagram illustrating a configuration according to another embodiment. As illustrated in FIG. 7, for the components having the same configurations as those of the above-described embodiment, which is illustrated in FIG. 2, the reference numerals that are the same as the reference numerals of FIG. 2 are used. For the configurations that are the same as those of the above-described embodiment, descriptions are omitted.

In the embodiment, an example is illustrated where an arrangement of an output cable 93 of the noise source 90 differs from that of the embodiment illustrated in FIG. 2. More specifically, the output cable 92 of FIG. 2 extends in the direction to separated from the window frame; however, in FIG. 7, the output cable 93 of the noise source 90 is extended along the window frame, and the output cable 93 approaches the first antenna 10. The embodiment is described while assuming that there are two noise sources, which are the noise generator 91 and the output cable 93. Since the noise generator 91 and the output cable 93 are individual noise sources, it is desirable that the second antenna 20 is installed at a position closer to both noise generator 91 and output cable 93, compared to the first antenna 10.

Specifically, in FIG. 7, a most proximate distance L6 between the second antenna conductor 25 and the output cable 93 is less than a most proximate distance L5 between the first antenna conductor 17 and the output cable 93 (L6<L5), and a distance L4 between the second conductor 25 and the noise generator 91 is less than a most proximate distance L3 between the first antenna conductor 17 and the noise generator 91 (L4<L3). In this manner, by establishing the relations L6<L5 and L4<L3, the second antenna 20A can be caused to easily receive noise from both noise generator 91 and output cable 93.

Here, as described above, the output cable 93 does not always emit the noise. For a case where the output cable 93 does not emit noise, it is not required to consider both conditions of L6<L5 and L4<L3, as illustrated in FIG. 7, and it suffices if only the relation L4<L3 is satisfied, so that the noise is mainly received from the noise generator 91 that emits the noise. In this case, L6 may be greater than L5.

Modified Example of the Embodiment

FIG. 8 illustrates a modified example of the embodiment. In the modified example of the embodiment, a case is illustrated in which the strength of the noise emitted from the noise generator 91 is so small that it can be negligible compared to the noise emitted from the output cable 93. In such a case, the output cable 93 is the main noise source for the first antenna 10. Thus, in FIG. 8, it is configured so that the second antenna 20 B can easily receive noise from the output cable 93, which is the main noise source for the first antenna 10, by setting L6<L5. In this case, the distance between the second antenna 20B and the noise generator 91 may be greater than the distance between the first antenna 10 and the noise generator 91. As described above, if there is a difference between the strength of the generated noise from the noise generator 91 and the strength of the generated noise from the output cable 93, and if one of them is the main noise source, it is desirable that the distance between the second antenna 20 B and the main noise source is less than the distance between the first antenna 10 and the main noise source.

Further, as illustrated in FIG. 8, for example, the second antenna 20 B may be installed in the vicinity of the window glass 60, such as a position on the vehicle body 70, instead of the window glass 60. In this case, if the vehicle body 70 is an insulator, such as a resin, the second antenna 20B may be directly installed on the vehicle body 70; and if the vehicle body 70 is a conductor, such as a metal, the antenna 20 B may be adhered to the metal vehicle body while separated by a dielectric, such as an adhesive layer. Further, in the above-described embodiments, examples are illustrated where the second antenna (20, 20A, and 20B) is installed on the window glass 60 or on the vehicle body 70; however, the second antenna (20, 20A, and 20B) may be installed across the window glass 60 or the the vehicle body 70 (including the body flange 71).

In this manner, by installing the second antenna 20B on the vehicle body 70 in the vicinity of the window glass 60, if the noise source is at a position close to the window glass, the noise can be reduced from the received signal obtained by the first antenna, a synthetic signal of the broadcast wave, in which the noise is reduced, can be output outside, and the second antenna can be installed at a low-visibility position, so that it is superior in aesthetics.

EXAMPLES

Example 1

Conductor Lengths of the First Antenna Conductor 17 and the Second Antenna Conductor 25

A vehicle window glass on which a glass antenna was installed was attached to an actual automobile, and the antenna gain was measured. The results are described.

In the AM broadcast wave band, for receiving a radio wave, a conductor length is the main factor, compared to a pattern of the antenna conductor. Thus, in this example, a feeding point was formed at an upper corner portion of the window glass, and the antenna conductor was linearly extended in the horizontal direction from the feeding point. The result is described below.

Figure 9A:
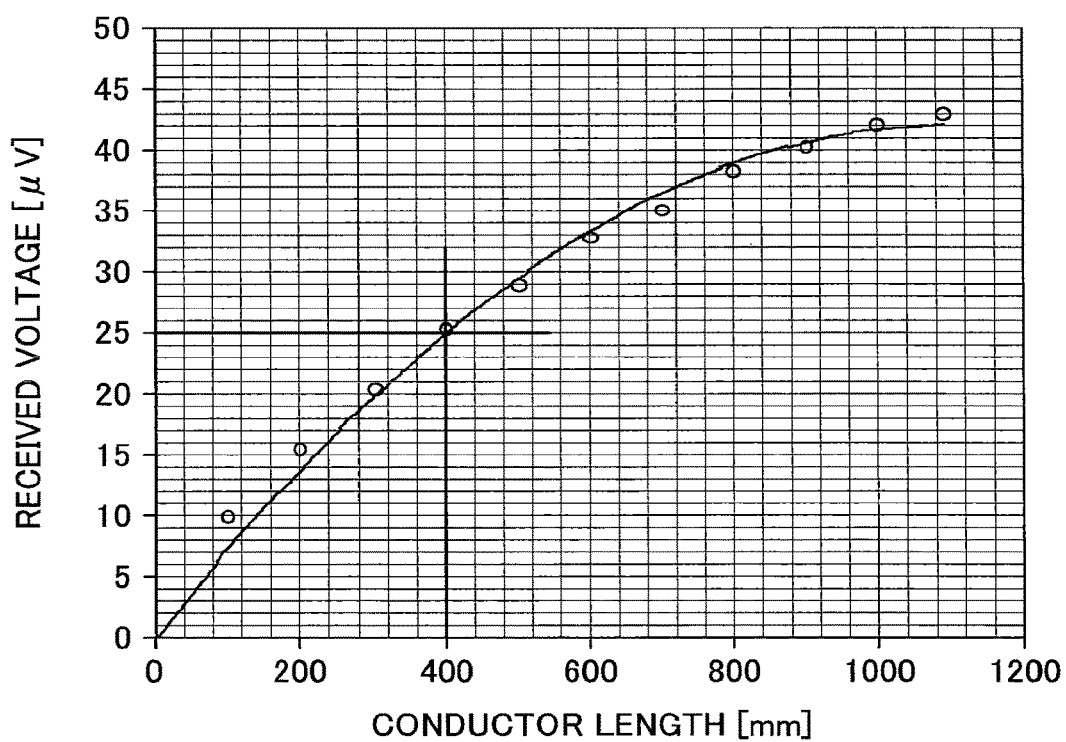
FIG. 9A is a graph showing actual measured values of a variation of an output voltage with respect to a conductor length.

First, a characteristic of an antenna is described, for which the AM broadcast wave band is the target of reception. FIG. 9A is a graph indicating the relative relationship between the conductor length and an antenna received voltage of the antenna conductor. Namely, FIG. 9A indicates actual measured values of variations in the output voltage with respect to the conductor length. The horizontal axis indicates an actual measured value of the conductor length of the antenna (unit: mm), and the vertical axis indicates a received voltage (unit: μV).

As it is clear from 9A, as for the reception performance of the antenna, for a case where the window opening of the vehicle is significantly smaller with respect to a wavelength, under the same conditions, reception gain (receiving capability) increases, as the conductor length becomes greater; and conversely, the reception gain decreases, as the conductor length becomes smaller. Namely, for an antenna with a long conductor, an amplitude of the received voltage is large, so that both radio wave in the AM broadcast band traveling from outside the vehicle and noise can be easily received. Whereas, for an antenna with a short conductor, due to the difference in the above-described gain, it is difficult to receive the radio wave in the AM broadcast band traveling from outside the vehicle and the noise.

Figure 9B:
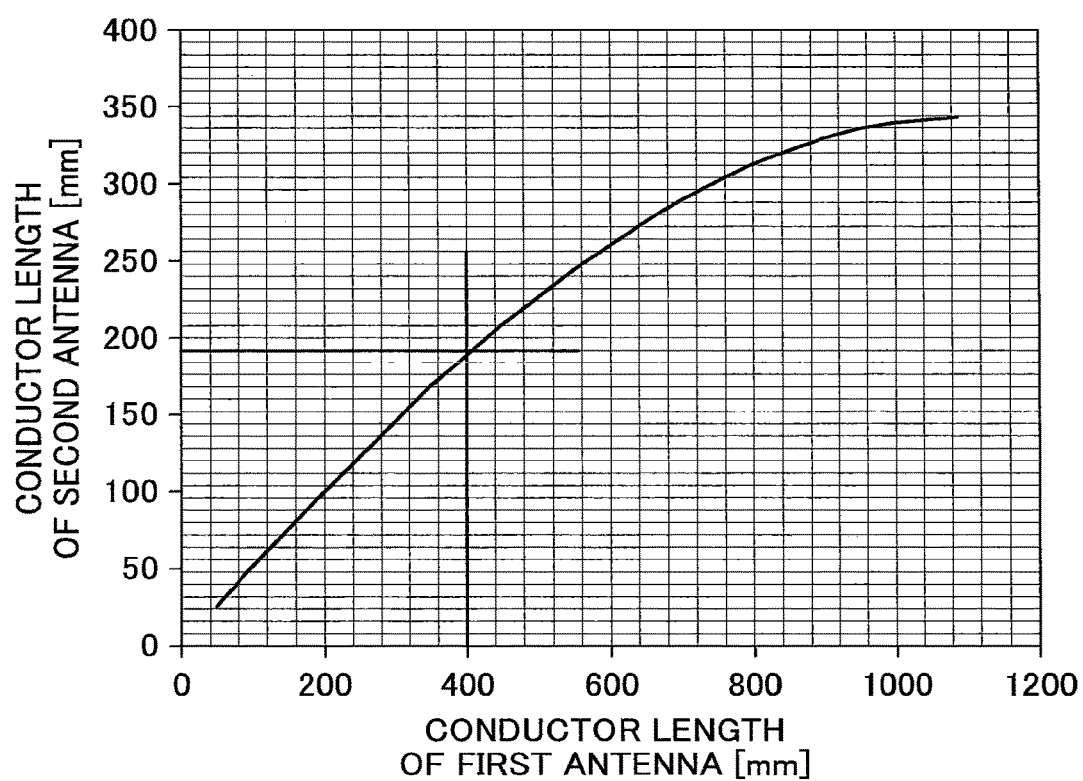
FIG. 9B is a graph indicating a length of a pickup antenna with which a difference between a received voltage of a second antenna and a received voltage of a first antenna is 5 dB.
Figure 9C:
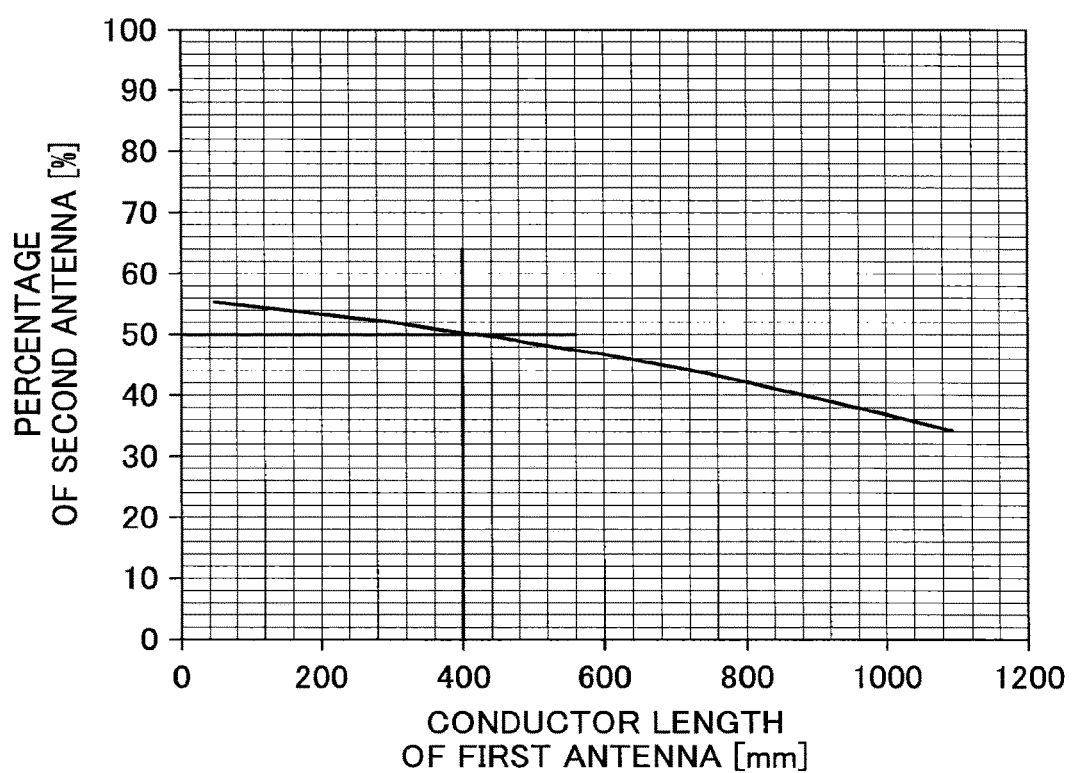
FIG. 9C is a graph in which a conductor length of the second antenna of FIG. 9B is converted into a percentage indication.
Figure 10:
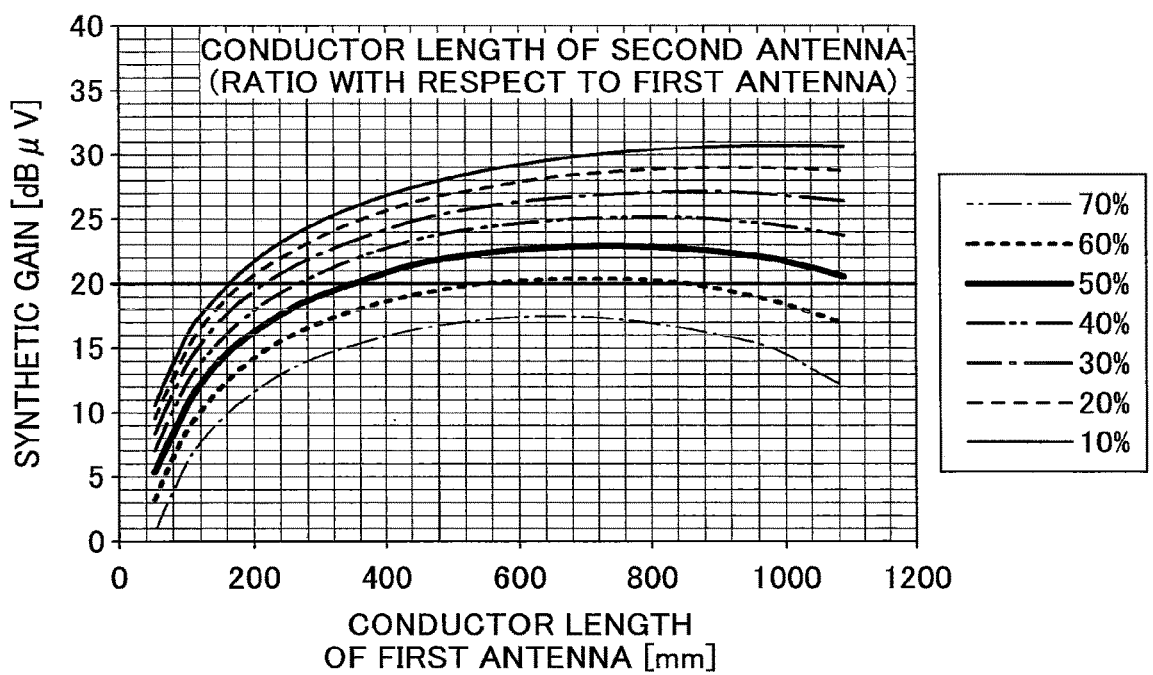
FIG. 10 is a graph indicating a synthetic output of the first antenna and the second antenna with respect to a conductor length of the first antenna.

Based on the above-described characteristic, preferred values for the required conductor length of the second antenna conductor 25 are described by referring to FIG. 9B, FIG. 9C, and FIG. 10. In order to obtain a receiving sensitivity, for which a synthetic loss is considered, having no practical problem for the AM broadcast wave, it is preferable that the received voltage of the antenna be 25 μV. From FIG. 9A, in order that the received voltage of the antenna is 25 μV, it is necessary that the conductor length of the first antenna conductor 17 is greater than or equal to 400 mm.

Further, in order to suppress the synthetic loss to be less than or equal to a practical predetermined value, the difference between the received voltage of the first antenna 10 and the received voltage of the second antenna 20 may preferably be greater than or equal to 5 dB. Thus, FIG. 9B, which is based on FIG. 9A, is a diagram indicating a correlation between the conductor lengths with which the difference between the received voltages of the first antenna 10 and the second antenna 20 is 5 dB.

FIG. 9C is a diagram in which the conductor length of the second antenna conductor 25 of FIG. 9B is converted into a percentage with respect to the conductor length of the first antenna conductor 17.

Here, from FIG. 9B and FIG. 9C, if the conductor length of the first antenna conductor 17 is 400 mm, it can be seen that, in order that the difference between the received voltages of the first antenna 10 and the second antenna 20 is 5 dB, the conductor length of the second antenna conductor 25 is less than or equal to 50% of the conductor length of the first antenna conductor 17.

In addition, FIG. 10 indicates a synthetic output of the first antenna 10 and the second antenna 20 when the conductor length of the first antenna conductor 17 is varied. The horizontal axis represents the conductor length of the first antenna conductor 17 (unit: mm), the vertical axis represents the synthetic AM gain (unit: dBμV), and the explanatory notes indicate the percentage of the conductor length of the second antenna conductor 25 with respect to the conductor length of the first antenna conductor 17. In FIG. 10, it is assumed that the distance between the first antenna 10 and the noise source is the same as the distance between the second antenna 20 and the noise source.

As for the synthetic gain (gain), 20 dBμV is required for the gain after synthesis, as a lowest practical sensitivity. As it is clear from FIG. 10, when the second antenna 20 is 60% with respect to the length of the first antenna 10, the lowest practical sensitivity of 20 dBμV is hardly exceeded. If it is less than or equal to 50%, the sensitivity that is greater than or equal to 20 dBμV, which has no practical problem, can be obtained. Thus, even if the gain after synthesis is considered, it is preferable that the conductor length of the second antenna conductor 25 be less than or equal to 50% of the conductor length of the first antenna conductor 17.

Second Example

Distance Between the Second Antenna 20 and the Noise Source 90

Similarity (correlation coefficients) between a waveform of the noise received by the first antenna 10 and a waveform of the noise received by the second antenna 20, and the strength (electric field) of the noise were measure, while varying the distance between the second antenna 20 and the noise source. FIG. 11 indicates the result. Note that, in this example, the strength of the noise is written as 0 dB for the case where the distance L4 between the second antenna and the noise source was 0 mm.

In FIG. 11, the horizontal axis indicates the distance of the second antenna 20 from the noise source 90 (unit: mm); and the vertical axis indicates the correlation coefficient and the electric field of the noise (unit: dB). Additionally, in FIG. 11, the chain line indicates the correlation coefficient, and the solid line indicates the electric field.

It can be seen from the result of FIG. 11 that the correlation coefficient becomes less than 0.7 if the distance between the second antenna 20 and the noise source 90 is greater than or equal to 320 mm. The correlation coefficient indicates the similarity between the waveforms of the noises. If the correlation coefficient is less than or equal to 0.7, the noise cancellation effect is lowered. Thus, the correlation coefficient may preferably be greater than or equal to 0.7. Namely, from the viewpoint of the correlation coefficient, it can be seen that the distance between the second antenna 20 and the noise source 90 may preferable be less than or equal to 320 mm.

Whereas, it can be seen that, if the distance between the second antenna 20 and the noise source 90 is greater than or equal to 210 mm, the electric field becomes less than −15 dB. The electric field indicates the strength of the noise. Thus, in order to receive, by the second antenna 2, the noise that is the same as the noise at the first antenna 10, the electric field may preferably be greater than or equal to −15 dB.

From above, in order to satisfy both conditions for the correlation coefficient and the electric field, it is desirable that the distance between the second antenna 20 and the noise source 90 is less than or equal to 210 mm; preferably less than or equal to 180 mm; more preferably less than or equal to 150 mm, and further more preferably less than or equal to 100 mm.

Example 3

Noise Cancellation Effect

A vehicle window glass on which a glass antenna according to the embodiment, which is illustrated in FIG. 2, was installed was attached to an actual automobile, and the antenna gain was measured. The results are described. In the embodiment illustrated in FIG. 2, the obtained antenna gain was measured. At that time, the sizes of the components illustrated in FIG. 2 in unit of mm were as follows:

the conductor length L1 of the first antenna conductor (11+12+13+14): 1120, the conductor length L2 of the second antenna conductor: 40, the area of the widened portion 22 of the second antenna conductor: 12×20, the distance L3 between the first antenna 10 and the noise generator 91: 84, the distance L4 between the second antenna 20 and the noise generator 91: 28, the distance L10 between the first antenna 10 and the body flange 71: 20, and the distance L20 between the second antenna 20 and the body flange 71: 20.

Figure 12A:
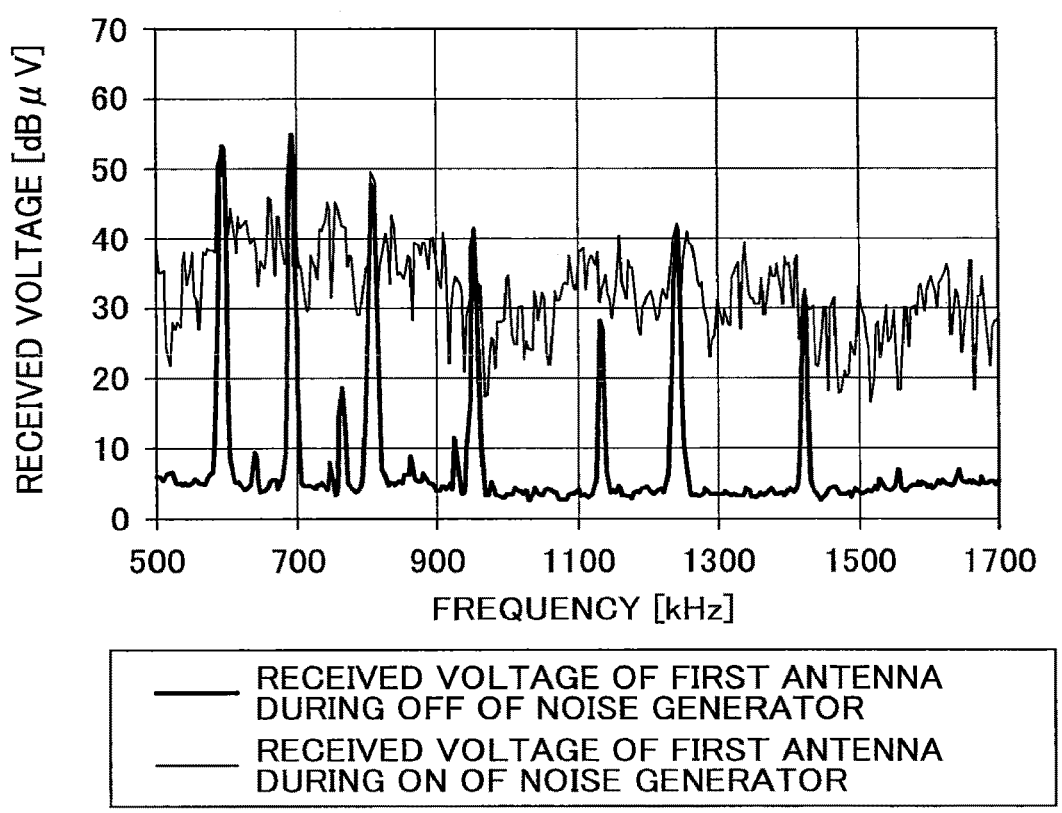
FIG. 12A is a graph indicating a received voltage waveform of a radio wave traveled from outside the vehicle, which is received by the first antenna.
Figure 12C:
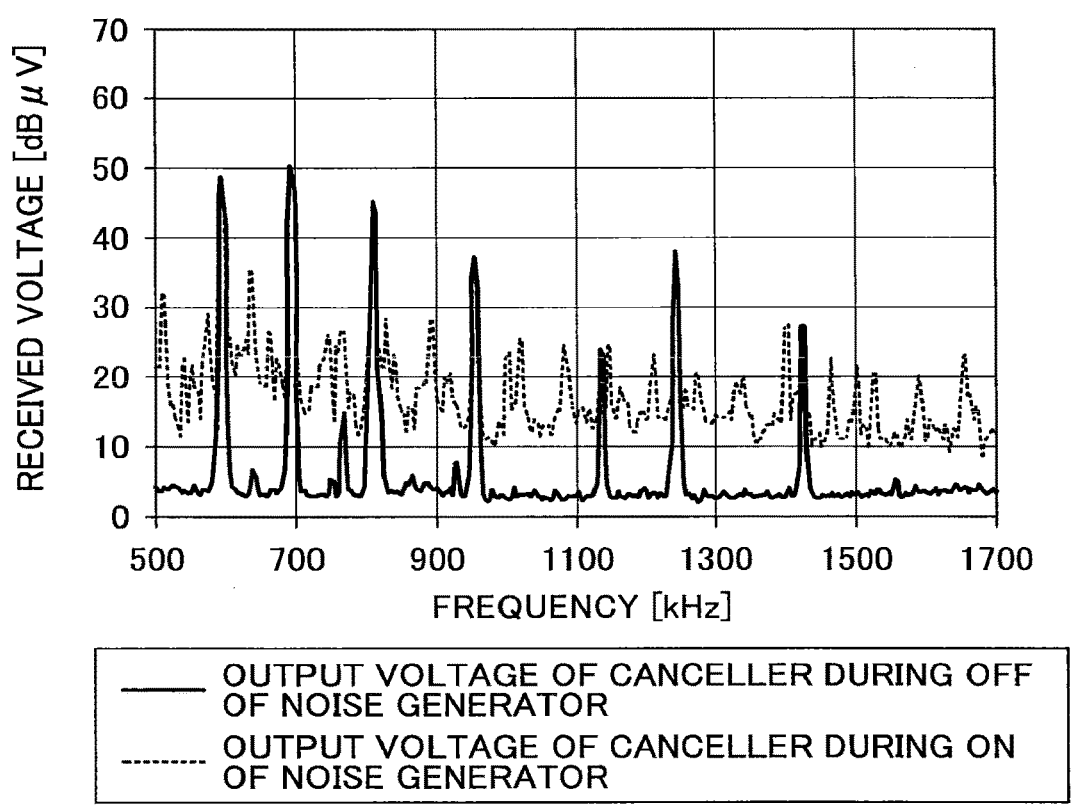
FIG. 12C is a graph indicating a voltage waveform, which is synthesized based on the voltage of FIG. 12A and the voltage of FIG. 12B.

FIG. 12A represents, for a radio wave traveling from outside the vehicle, a waveform of the received voltage received by the first antenna 10; FIG. 12B represents, for the radio wave traveling from outside the vehicle, a waveform of the received voltage received by the second antenna 20; and FIG. 12C represents a waveform of the output voltage after these were added by using the canceller. In each of FIG. 12A to FIG. 12C, the horizontal axis indicates a frequency (unit: kHz), and the vertical axis indicates the received voltage (unit: dBμV).

In FIGS. 12A and 12B, the thick lines indicate the received voltage of the first antenna 10 and the received voltage of the second antenna 20, respectively, for a case where the noise source was turned off; and the thin lines indicate the received voltage of the first antenna 10 and the received voltage of the second antenna 20, respectively, for a case where the noise source was turned on. Here, the state where the noise source is turned off represents a state where driving of the noise source is stopped, and no signal is generated. Further, the state where the noise source is turned on represents a state where the noise source is driven, and signals are generated.

In FIG. 12C, the thick line indicates the output voltage of the canceler for a case where the noise source was turned off; and the dotted line indicates the output voltage of the canceler for a case where the noise source was turned on.

When the noise generator 91 was turned off, in FIGS. 12A to 12C, spectra of the received broadcast waves were clearly shown. At this time, the received voltage of the broadcast wave received by the second antenna 20 was less than the received voltage of the broadcast wave received by the first antenna 10. For example, in the vicinity of the frequency of 700 kHz, the value of the received voltage of the broadcast wave for the first antenna 10 was approximately 55 dBμV, and the value of the received voltage of the broadcast wave for the second antenna 20 was approximately 40 dBμV. In this manner, the second antenna 20 received the broadcast wave at a level that was lower than that of the first antenna 10 by 15 dBμV in average.

Whereas, when the noise generator 91 was turned on, there was almost no difference in the wave forms of the noise signals (the portions other than the specific peaks of the broadcast wave) between the received voltage received by the second antenna 20 and the received voltage received by the first antenna 10, which is shown in FIG. 12A.

FIG. 12C indicates a voltage waveform, which was synthesized based on the voltage of FIG. 12A and the voltage of FIG. 12B. As it is clear by comparing the thin lines in FIG. 12A and FIG. 12B and the dotted line in FIG. 12C, by synthesizing the signals, the value of the output voltage of the noise was significantly reduced when the noise generator 91 was turned on. In the example of FIG. 12C, the noise level after the synthesis could be lowered by 20 dBμV in the average value, and the noise cancellation effect was obtained. Note that, at this time, the distance L4 between the second antenna 20 and the noise generator 91 was 33% of the distance between the first antenna 10 and the noise generator 91.

As described above, by devising the shape and arrangement of the antenna, the reception gain of the AM broadcast wave received by the second antenna 20 can be adjusted to be lower than the reception gain of the AM broadcast wave received by the first antenna 10; and the output of the noise received by the first antenna 10 can be adjusted to be equal to the output of the noise received by the second antenna 20.

With the antenna system according to the present invention, for a case where a noise source is located at a position close to a broadcast antenna, reception performance for receiving the broadcast wave received by the broadcast antenna can be prevented from being lowered.

The present invention is preferably used, for example, especially for a long wave broadcast band (LW band) (150-280 kHz), the AM broadcast band (MW band) (520-1700 kHz), a shortwave broadcast band (SW band) (2.3-26.1 MHz), the FM broadcast band in Japan (76-90 MHz), the FM broadcast band in the United States (88-108 MHz), TV VHF band (90-108 MHz, 170-222 MHz), TV VHF band in the United States and in Europe (45-86 MHz, 175-225 MHz), and the band III of the digital audio broadcasting (Digital Audio Broadcasting: DAB) (174-240 MHz).

The antenna system is described above by the embodiments and the examples. However, the present invention is not limited to the above-described embodiments and the examples. Various modifications and improvements, such as combinations and replacement of a part or all of the other embodiments and examples, may be made within the scope of the present invention.

The invention claimed is:

1. An antenna system comprising:
 a first antenna that includes a first antenna conductor and
  a first feeding point, wherein the first antenna is to
  receive a broadcast wave in a predetermined frequency
  band;

a second antenna that includes a second antenna conductor and a second feeding point, wherein the second antenna is to receive noise from a noise source; and a canceler to cancel a noise signal received by the second antenna from a received signal received by the first antenna, wherein the first antenna and the second antenna are installed at respective locations, a radio wave of the broadcast wave in the predetermined frequency band equally reaching the locations, and wherein reception gain for the predetermined frequency band received by the second antenna is lower than reception gain for the predetermined frequency band received by the first antenna, and an output of the noise received by the first antenna is adjusted to be equal to an output of the noise received by the second antenna.

2. The antenna system according to claim 1, wherein the first antenna and the second antenna are installed on a window glass arranged at an window opening formed in a vehicle body, and wherein the noise source is installed in a vicinity of the window glass.

3. The antenna system according to claim 2, wherein the second antenna is installed at a position that is closer to the vehicle body, compared to the first antenna.

4. The antenna system according to claim 1, wherein a conductor length of the second antenna conductor is less than a conductor length of the first antenna conductor.

5. The antenna system according to claim 4, wherein the conductor length of the second antenna conductor is less than or equal to 50% of the conductor length of the first antenna conductor.

6. The antenna system according to claim 1, wherein the reception gain of the second antenna is less than the reception gain of the first antenna at least by 5 dB.

7. The antenna system according to claim 1, wherein the second antenna is installed at the location that is closer to the noise source, compared to the first antenna.

8. The antenna system according to claim 7, wherein the noise source includes a noise generator, and wherein the second antenna is installed at the location that is closer to the noise generator, compared to the first antenna.

9. The antenna system according to claim 7, wherein the noise source includes an output cable, and wherein the second antenna is installed at the location that is closer to the output cable, compared to the first antenna.

10. The antenna system according to claim 9, wherein the second antenna is installed at the location that overlaps the output cable in a planar view.

11. The antenna system according to claim 1, wherein the second antenna conductor includes a portion at which a line width is large, and a portion at which the line width is small.

12. The antenna system according to claim 1, wherein the canceler controls at least one of the received signal of the first antenna and the received signal of the second antenna, so that an output of the noise received by the first antenna is adjusted to be equal to an output of the noise received by the second antenna.

13. The antenna system according to claim 1, wherein the canceler synthesizes a signal of the broadcast wave and the noise output from the first antenna and a signal of the broadcast wave and the noise output from the second antenna, a phase of the signal of the broadcast wave and the noise output from the second antenna being inverted, so that a synthesized signal of the broadcast wave, the noise being reduced in the synthesized signal, is output outside.

14. The antenna system according to claim 1, wherein the predetermined frequency band is included in a band that is greater than or equal to 150 kHz and less than or equal to 300 MHz.

\* \* \* \* \*